(12) United States Patent
Hildebrandt et al.

(10) Patent No.: US 7,093,982 B1
(45) Date of Patent: Aug. 22, 2006

(54) COUPLING DEVICE

(75) Inventors: Peter Hildebrandt, Berlin (DE); Lutz Melchior, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/322,715

(22) Filed: May 28, 1999

(30) Foreign Application Priority Data

May 28, 1998 (DE) .......................... 198 25 385

(51) Int. Cl.
*G02B 6/36* (2006.01)

(52) U.S. Cl. .................. 385/53; 385/89; 385/137
(58) Field of Classification Search ............ 385/53, 385/56, 58–60, 62, 70–72, 75–78, 81, 83, 385/87, 89, 136–137
See application file for complete search history.

(56) References Cited

U.S. PATENT DOCUMENTS 4,798,440 A * 1/1989 Hoffer et al. ............... 385/89
5,799,122 A * 8/1998 Jeong et al. ................ 385/59

FOREIGN PATENT DOCUMENTS

DE 3103797 A1 12/1981

OTHER PUBLICATIONS

Plastic–Based Receptacle–Type VCSEL–Array Modules with One and Two Dimensions Fabricated Using the Self-Alignment Mounting Technique, Hideo Kosaka et al., 1997 Electronic Components and Technology Conference, pp. 383–384.

* cited by examiner

*Primary Examiner*—John D. Lee
*Assistant Examiner*—Sarah N Song
(74) *Attorney, Agent, or Firm*—Laurence A. Greenberg; Werner H. Stemer; Gregory L. Mayback

(57) ABSTRACT

The optical fiber holder of the coupling device has a top, a bottom, and narrow side faces between the top and the bottom. Intermediate faces are formed at the transitions between the narrow side faces and the top and the bottom. A receptacle into which the holder is inserted axially has internal contact areas which are in contact with the intermediate faces without play.

18 Claims, 1 Drawing Sheet

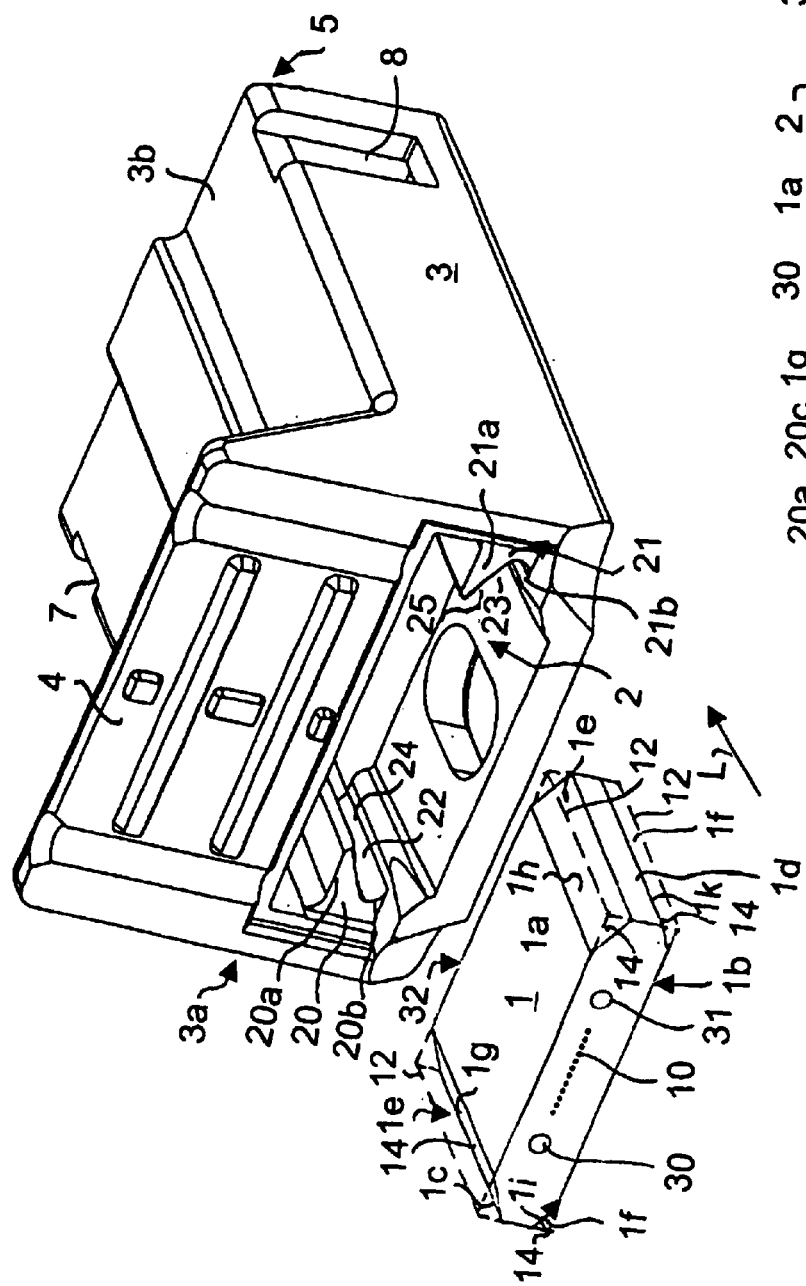

COUPLING DEVICE

BACKGROUND OF THE INVENTION

Field of the Invention

The invention lies in the field of optical connector technology, in particular releasable multichannel optical connections using plug-in connectors.

The invention pertains to a coupling device with an optical fiber holder which has a top face and a bottom face with narrow side faces between them, and with a receptacle into which the holder is inserted in a longitudinal direction.

A coupling device of this kind is known from a publication by H. Kosaga et al. entitled "Plastic-Based Receptacle-Type VCSEL-Array Modules with One and Two Dimensions Fabricated Using the Self-Alignment Mounting Technique," in ETC Proceedings 1997 (Electronic Components and Technology Conference), p. 383–384. That device involves a holder designed as a plug-in connector for accepting several parallel optical fiber ends and with projecting aligning pins at the end face. Such holders are also designated as MT ferrules. For its part the holder is brought into a plug-in connector housing with locking elements and is supported floating therein. The holder has a top face, a bottom face and narrow side faces running rectangularly between these. The holder therefore has an essentially cuboidal geometry.

In the longitudinal direction (plug-in direction) the holder together with the plug-in connector housing can be inserted into a receptacle, also known as adapter or socket, whereby locking hooks of the receptacle engage with the locking elements of the plug-in connector housing. In the plugged-in state the aligning pins together with corresponding aligning bores enable the holder to be aligned in a laser module, or coupling partner to which it must be coupled, in such a way that the individual optical fiber ends taken up by the holder are aligned on optically active light-irradiating zones of a vertically emitting laser array within the module.

This is only possible, however, if it can be guaranteed that during the plug-in procedure the holder is successfully aligned with respect to the engagement of the aligning pins with the corresponding aligning bores. This in turn requires extremely precise fabrication, especially of the holder, on the one hand, and on the other, with respect to the positioning of the receptacle (adapter) relative to the module and the optically active zones. This is especially problematic in view of the trend towards ever increasing numbers of optical fibers in a common holder. Furthermore, constructions of prior art from connection techniques used for mutual alignment of the coupling partners in single optical fiber connectors appear to be unsuitable on grounds of the flat structure of the holder.

Since the prior art device is subject to positioning tolerances both between the holder and the receptacle (adapter) and between the receptacle and the coupling partner (for example the electro-optical module), the prior art device demands the highest precision with respect to the fabrication of the individual components, of the assembly and of the positioning.

SUMMARY OF THE INVENTION

It is accordingly an object of the invention to provide an optical coupling device, which overcomes the above-mentioned disadvantages of the heretofore-known devices and methods of this general type and in which the optical fiber holder is reproducibly fixed free of play and accurately placed with respect to being taken up into a predefined relative position.

With the foregoing and other objects in view there is provided, in accordance with the invention, a coupling device, comprising: an optical fiber holder having a top face, a bottom face, narrow side faces between the top face and the bottom face, with transition regions formed between the narrow side faces, and the top face and the bottom face, respectively, and intermediate faces formed in the transition areas; and a receptacle for receiving the holder along a longitudinal insertion direction, the receptacle having inside contact areas contacting the intermediate faces without play.

A considerable advantage of the invention is that the intermediate faces of the holder and the contact areas of the receptacle form corresponding alignment contours so that a precise, predeterminable relative positioning of holder and receptacle is guaranteed without further adjustment. This also leads to the considerable fabrication advantage that there is no need for a relative adjustment between holder and receptacle or for any subsequent mutual fixing by means of fixing material or other aids. A further advantage of the device according to the invention is that the support of the holder in the receptacle also allows a coupling partner intended to be coupled (for example a plug-in connector) to be fixed free from play. The fact that there is no play in the fixing means that tension and shearing forces on the coupling partner can be better diverted, which leads to a greater mechanical stability of the holder.

In accordance with an added feature of the invention, the holder has a substantially cuboid shape, and the intermediate faces are bevels formed along longitudinal edges defined by the cuboid shape.

In principle, the necessary force to be exerted on the contact areas or pressings for ensuring there is no play between the holder and the receptacle can be generated through flexible, plastic or elastoplastic resilient structures forming part of the receptacle. In this context, a preferred structural and fabrication-related embodiment of the invention involves the contact areas being part of a longitudinally aligned V-shaped recess.

In accordance with an additional feature of the invention, the contact areas are defined by a longitudinal V-shaped recess.

In accordance with a preferred embodiment, there are provided one or more rails in the receptacle, the rails having two resiliently splayable limbs forming the V-shaped recess.

In accordance with another feature of the invention, the V-shaped recess is formed between two limbs, and the contact surface is formed from an at least partially plastically deformed section of the limb.

In other words, depending on the particular application and the combination of materials it may be advantageous for the V-shaped recess to be formed between two limbs of a rail, which limbs can splay resiliently apart. In accordance with a preferred embodiment of the invention, an at least partially plastic deformation of areas of the receptacle provided for that purpose is realized in that the V-shaped recess is formed between two limbs, whereby the contact area is formed from an at least partially plastically deformed section of the limb.

A preferred use of the invention involves the realization of coupling units or coupling sockets for multichannel electro-optical modules. In this respect it is advantageous if the receptacle is part of a coupling socket in one open side of which it is possible to insert an optical fiber plug-in connector which is to be coupled.

Other features which are considered as characteristic for the invention are set forth in the appended claims.

Although the invention is illustrated and described herein as embodied in coupling device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

FIG. 1 is a perspective view of a coupling device in accordance with the invention; and FIG. 2 is a front elevational view of the fixing of a holder in a receptacle.

DESCRIPTION OF THE PREFERRED EMBODIMENTS

Referring now to the figures of the drawing in detail and first, particularly, to FIG. 1 thereof, there is seen a greatly enlarged illustration of a coupling device in accordance with the invention. The coupling device includes an optical fiber holder 1. Solely for reasons of clearer representation, the holder 1 is shown separated from a receptacle 2, which is a part of a coupling socket 3. The coupling socket 3 has a rearward end 3a which is provided for mechanical fixing to a non-illustrated electro-optical transmit/receive module (transceiver module), and is formed with a mounting flange 4. An opening 5 at the front-side end 3b of the coupling socket 3 is shaped for insertion of an additional optical fiber holder, which can essentially conform with the illustrated holder 1 and which can form a coupling partner for the holder 1. Lateral openings 7,8 of the coupling socket serve for engagement of corresponding locating hooks of the coupling partner in a manner known, for example, from the publication mentioned at the beginning.

The holder 1 has a top face 1a and a bottom face 1b and as indicated in the drawing contains several, for example twelve, optical fiber ends 10 running lengthwise parallel to one another (in the longitudinal direction L) between the front end-face and the rear end-face of the holder 1. Narrow-side faces 1c and 1d run between the a top face 1a and the bottom face 1b. The narrow-side faces 1c, 1d abut the respective upper intermediate areas 1e and lower intermediate areas 1f which in turn abut respectively on the top face 1a and the bottom face 1b. The intermediate areas 1e, 1f are preferably formed such that the original cuboidal shaped body of the holder 1 is provided in each case with a bevel 14 through removal of the respective longitudinal edge 12. The original longitudinal edges and the areas of material removed from the holder 1 in producing the bevels are indicated in FIG. 1 with broken lines. As a result a sloping intermediate face 1g, 1h runs respectively between each of the narrow-side faces 1c, 1d and the adjacent top face 1a and a sloping intermediate face 1i, 1k runs respectively between each of the narrow-side faces 1c, 1d and the adjacent bottom face 1b. It will be understood that the intermediate faces do not have to be identical to the exemplary embodiment of FIG. 1 but can also, for example, have a slightly concave shape. The essential issue involved in specifying the dimensions of the outside contour of the holder and the shape of the intermediate faces is to guarantee the interaction described below between the intermediate faces and the contact areas of the receptacle 2.

Referring now to FIG. 2, it is clear from the view into the A rearward end 3a of the coupling socket 3 that the receptacle 2 has rails 20, 21 opposite one another on the inner longitudinal walls. The rails can also preferably be formed with a longitudinally running slot 22, 23. As a result the rails have limbs 20a, 20b and 21a, 21b, between which a recess 24, 25 with V-shaped cross-section exists.

In the mounted position the holder 1 is introduced into the receptacle 2 in the longitudinal direction L such that physical contact exists respectively between the intermediate faces 1g to 1k and the corresponding facing contact areas 20c, 20d and 21c, 21d of the rails 20a, 20b and 21a, 21b. In a preferred embodiment the limbs can be flexibly splayed out through the holder 1 such that the V-shaped recesses 24, 25 are widened with resilient bending of the limbs. The resilient splaying of the limbs results in a reliable pressing-down force for generating an adequate physical contact between the contact area, say, 20c and the corresponding intermediate face 1g. The contact areas (e.g. 20c) can be fitted with protruding pinching ribs (not explicitly illustrated in the figure), which are flexibly deformed when the holder 1 is inserted into the receptacle 2 and thus provide for particularly effective physical contact.

The holder 1 may be formed with through bores 30, 31, which extend to its coupling-side end face 32 (FIG. 1) and accept centering pins or combine with centering pins of a coupling partner to provide precise alignment. Preferred is the coupling partner embodied as plug-in connector with an optical fiber holder, which is embodied correspondingly to the holder illustrated and thereby also benefits from the high-precision centering mechanism between its intermediate faces and the contact areas of the receptacle. The contact areas are preferably formed symmetrically to the level of the optical fiber ends 10.

We claim:

1. Coupling device, comprising:
   an optical fiber holder having a top face, a bottom face, narrow side faces between said top face and said bottom face, with transition regions formed between each of said narrow side faces, and each of said top face and said bottom face, respectively, and intermediate faces formed in all four of said transition regions; and
   a receptacle for receiving said holder along a longitudinal insertion direction, said receptacle having four resilient inside contact areas, each exerting a resilient force on a corresponding intermediate face of said holder.

2. The coupling device according to claim 1, wherein said holder has a substantially cuboid shape, and said intermediate faces are bevels formed along longitudinal edges defined by the cuboid shape.

3. The coupling device according to claim 1, wherein said contact areas are defined by a longitudinal V-shaped recess.

4. The coupling device according to claim 1, wherein said holder is a coupling unit of one of a multichannel transmitter module and receiver module.

5. The coupling device according to claim 1, wherein said holder is a coupling unit of a multichannel transceiver module.

6. The coupling device according to claim 1, wherein said receptacle forms a part of a coupling socket having an open side adapted to receive therein an optical fiber plug-in connector.

7. Coupling device, comprising:

an optical fiber holder having a top face, a bottom face, narrow side faces between said top face and said bottom face, with transition regions formed between said narrow side faces, and said top face and said bottom face, respectively, and intermediate faces formed in said transition regions;

a receptacle for receiving said holder along a longitudinal insertion direction, said receptacle having inside contact areas contacting said intermediate faces without play, said contact areas defined by a longitudinal V-shaped recess; and two rails disposed in said receptacle, said rails each having two resiliently splayable limbs forming said V-shaped recess.

8. The coupling device according to claim 7, wherein said holder is a coupling unit of one of a multichannel transmitter module and receiver module.

9. The coupling device according to claim 7, wherein said holder is a coupling unit of a multichannel transceiver module.

10. The coupling device according to claim 7, wherein said receptacle forms a part of a coupling socket having an open side adapted to receive therein an optical fiber plug-in connector.

11. Coupling device, comprising:

an optical fiber holder having a top face, a bottom face, narrow side faces between said top face and said bottom face, with transition regions formed between said narrow side faces, and said top face and said bottom face, respectively. and intermediate faces formed in said transition regions;

a receptacle for receiving said holder along a longitudinal insertion direction, said receptacle having inside contact areas contacting said intermediate faces without play, said contact areas defined by a longitudinal V-shaped recess; and a rail disposed in said receptacle, said rail having two resiliently splayable limbs forming said V-shaped recess.

12. The coupling device according to claim 11, wherein said holder is a coupling unit of one of a multichannel transmitter module and receiver module.

13. The coupling device according to claim 11, wherein said holder is a coupling unit of a multichannel transceiver module.

14. The coupling device according to claim 11, wherein said receptacle forms a part of a coupling socket having an open side adapted to receive therein an optical fiber plug-in connector.

15. Coupling device, comprising:

an optical fiber holder having a top face, a bottom face, narrow side faces between said top face and said bottom face, with transition regions formed between said narrow side faces, and said top face and said bottom face, respectively, and intermediate faces formed in said transition regions; and a receptacle for receiving said holder along a longitudinal insertion direction, said receptacle having inside contact areas contacting said intermediate faces without play, said contact areas defined by a longitudinal V-shaped recess formed between two limbs;

said contact surface formed from an at least partially plastically deformed section of said limb.

16. The coupling device according to claim 15, wherein said holder is a coupling unit of one of a multichannel transmitter module and receiver module.

17. The coupling device according to claims 15, wherein said holder is a coupling unit of a multichannel transceiver module.

18. The coupling device according to claim 15, wherein said receptacle forms a part of a coupling socket having an open side adapted to receive therein an optical fiber plug-in connector.

\* \* \* \* \*